(12) United States Patent
Hatton

(10) Patent No.: US 8,627,852 B2
(45) Date of Patent: Jan. 14, 2014

(54) APERTURED FLOW CONTROL ELEMENT AND HOUSING STRUCTURE THEREFOR

(75) Inventor: Jason D. Hatton, Essexville, MI (US)

(73) Assignee: AptarGroup, Inc., Crystal Lake, IL (US)

( * ) Notice: Subject to any disclaimer, the term of this patent is extended or adjusted under 35 U.S.C. 154(b) by 1013 days.

(21) Appl. No.: 12/321,505

(22) Filed: Jan. 22, 2009

(65) Prior Publication Data

US 2010/0180971 A1 Jul. 22, 2010

(51) Int. Cl.
*F16K 15/14* (2006.01)

(52) U.S. Cl.
USPC ........... 137/859; 137/224; 251/82; 251/149.1

(58) Field of Classification Search
USPC .............. 137/843, 852, 854, 859, 512.4, 224, 137/522; 251/82, 149.1
See application file for complete search history.

(56) References Cited

U.S. PATENT DOCUMENTS

| | | | | |
|---|---|---|---|---|
| 3,490,488 | A * | 1/1970 | Grist | 137/512.4 |
| 4,182,355 | A * | 1/1980 | Briel et al. | 137/496 |
| 4,712,583 | A * | 12/1987 | Pelmulder et al. | 137/852 |
| 6,112,952 | A | 9/2000 | Hess, III et al. | |
| 6,386,247 | B1 | 5/2002 | Elze et al. | |
| 6,591,429 | B1 * | 7/2003 | Jaszai | 2/455 |
| 6,951,295 | B1 | 10/2005 | Gaus et al. | |
| 2003/0020040 | A1 * | 1/2003 | Anderson | 251/149.1 |

FOREIGN PATENT DOCUMENTS

CN 2387340 Y 7/2000

* cited by examiner

*Primary Examiner* — Kevin Lee
*Assistant Examiner* — Macade Brown
(74) *Attorney, Agent, or Firm* — Wood, Phillips, Katz, Clark & Mortimer

(57) ABSTRACT

A valve (20) and flow control element (22) are provided for use with a dunnage bag (24). The valve (20) includes a valve housing (40) that carries an actuator (36) and the flow control element (22). The housing (40) defines a flow passage (44), and a seal surface (48) around the flow passage. The flow control element (22) includes a peripheral attachment portion (60), a resilient, intermediate portion (62) extending generally laterally inwardly from the peripheral attachment portion and defining at least one flow aperture (64); and an imperforate central portion (68) extending generally laterally inwardly from the intermediate portion and including a seal (70) for sealing against the housing seal surface with the flow control element in a normally closed position. The intermediate portion of the flow control element accommodates movement of the seal between the normally closed position and an open position away from the seal surface in response to the central portion being subjected to an opening force, thereby permitting flow of a fluent substance through the flow passage and the at least one flow aperture.

18 Claims, 12 Drawing Sheets

APERTURED FLOW CONTROL ELEMENT AND HOUSING STRUCTURE THEREFOR

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD OF THE INVENTION

This invention relates to valves for a fluent material, and in more particular applications, to valves that control the air flow into and out of dunnage bags such as are used to cushion cargo in transit.

BACKGROUND OF THE INVENTION

Dunnage bags are commonly used to secure and protect cargo, such as cargo stacked on pallets, during transit. The dunnage bags are positioned between the cargo and then filled with air that is typically pressurized somewhat greater than ambient to secure the cargo during transit, with the air being released from the bags to allow the cargo to be unloaded after transit.

It is known to provide a valve on each of the dunnage bags that is compatible with a fill tool for supplying the pressurized air into the dunnage bag via the valve, and it is also known for the valve to be moved between a closed, sealed condition and an open, fill position by engagement and disengagement of the fill tool with the valve. While many of the known valves may work well for their intended purpose, there is always room for improvement.

SUMMARY OF THE INVENTION

In accordance with one feature of the invention, a flow control element is provided for operatively cooperating with a housing having a seal surface around a flow passage. The flow control element includes a peripheral attachment portion by which the flow control element may be attached to the housing; a resilient, intermediate portion extending generally laterally inwardly from the peripheral attachment portion and defining at least one flow aperture; and an imperforate central portion extending generally laterally inwardly from the intermediate portion and including a seal for sealing against the housing seal surface around the housing flow passage with the flow control element is in a normally closed position. The intermediate portion of the flow control element accommodates movement of the seal between the normally closed position and an open position away from the housing seal surface in response to the flow control element central portion being subjected to an opening force, thereby permitting flow of a fluent substance through the housing flow passage and through the at least one flow aperture of the flow control element intermediate portion.

As one feature, the seal has a generally annular configuration defining at least an annular surface that is adapted for sealing against the housing seal surface.

In one feature, the flow control element is a unitary structure molded in a one piece, flexible, resilient material.

According to one feature, the seal has a generally annular configuration at a radially outward region of the central portion, the at least one flow aperture defined by the flow control element intermediate portion is one of a plurality of such flow apertures, and the intermediate portion includes a plurality of circumferentially spaced resilient legs extending between the attachment portion and the seal.

In one feature, the seal has an annular configuration at a radially outwardly region of the central portion, and the central portion includes a center region that is located radially inwardly of the seal and that is spaced axially from the annular configuration of the seal.

According to one feature, the flow control element combines with the housing to define an assembly in which the housing and flow control element are held together at the peripheral attachment portion of the flow control element. As a further feature, the flow control element and the housing are separate parts that are mechanically mated together at the peripheral attachment portion of the flow control element.

In accordance with one feature of the invention, a flow control device includes a housing, a flow control element, and an actuator. The housing defines a flow passage, and a seal surface around the flow passage. The flow control element includes a peripheral attachment portion by which the flow control element may be attached to the housing; a resilient, intermediate portion extending generally laterally inwardly from the peripheral attachment portion and defining at least one flow aperture; and an imperforate central portion extending generally laterally inwardly from the intermediate portion and including a seal for sealing against the housing seal surface around the housing flow passage with the flow control element in a normally closed position. The intermediate portion of the flow control element accommodates movement of the seal between the normally closed position and an open position away from the housing seal surface in response to the flow control element central portion being subjected to an opening force, thereby permitting flow of a fluent substance through the housing flow passage and through the at least one flow aperture of the flow control element intermediate portion. The actuator is disposed for movement in the housing between first and second positions, and includes a force-bearing member, and a base engaged against the central portion of the flow control element to move the flow control element from the closed positioned to the open position with movement of the actuator from the first position to the second position.

As one feature, the actuator force-bearing member includes two radially spaced legs extending from the base in an axial direction opposite from the central portion of the flow control element. According to a further feature, the housing includes a pair of axial guides, each receiving a corresponding one of the legs for axially guided movement between the first and second positions.

In one feature, the actuator base has a planar surface facing the central portion for engagement therewith.

According to one feature, the housing includes a pair of stop surfaces; and the actuator includes a pair of stops connected to the base, the stops being spaced from the stop surfaces in the first position and abutted against the stop surfaces in the second position. As a further feature, each of the stops is connected to the base by a pair of extensions. In yet a further feature, the housing further includes a pair of slots, each slot receiving a corresponding one of the extensions and wherein a corresponding one of the stop surfaces is provided immediately adjacent each of the slots for engagement with a corresponding stop in the second position. In an even further feature, the stops and the slots form a snap fit connection between the actuator and the housing.

As one feature, the base has a surface opposite from the control portion, the surface being engageable against the housing to limit movement of the actuator away from the central portion.

In one feature, the housing defines an outwardly projecting annular wall that has a radially inwardly facing surface defining at least part of the housing flow passage.

As one feature, the flow control device includes a retention ring mounted to the housing to clamp the flow control element peripheral attachment portion between the retention ring and a portion of the housing.

According to one feature, the flow control device includes a snap fit connection between the actuator and the housing.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, in which like numerals are employed to designate like parts throughout the same.

FIGS. 2-12 show only the valve per se without the dunnage bag, retention washer, and fill tool; and FIG. 2 is an isometric view from an exterior side of the valve when closed;

FIG. 3 is an isometric view from an interior side of the valve when closed;

FIG. 4 is an exploded, isometric view from the exterior side of the valve when closed;

FIG. 5 is an exploded isometric view from the interior side of the valve when closed;

FIG. 6 is a plan view of the exterior side of the valve when closed;

FIGS. 10, 11 and 12 are views similar to FIG. 8A, but showing various alternate embodiments of the valve and flow control element.

DETAILED DESCRIPTION OF THE PREFERRED EMBODIMENT

While this invention is susceptible of embodiment in many different forms, this specification and the accompanying drawings disclose only some specific forms as examples of the invention. The invention is not intended to be limited to the embodiments so described, however. The scope of the invention is pointed out in the appended claims.

For ease of description, various embodiments of components of this invention are described in certain orientations. It will be understood, however, that the components of this invention may be manufactured, stored, transported, used, and sold in orientations other than those described.

Figure 1:
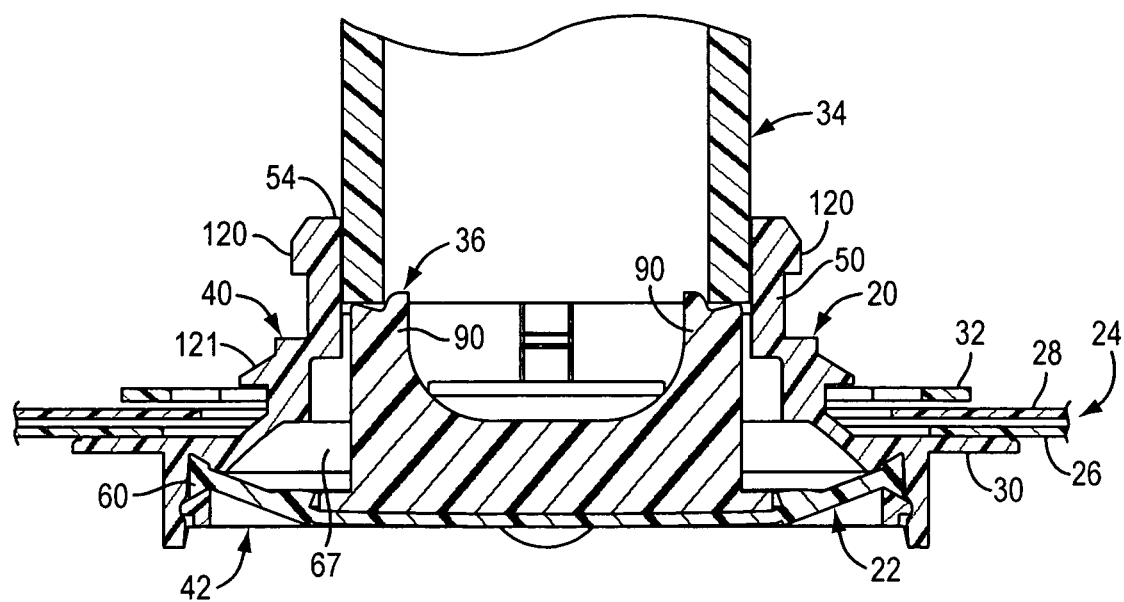
FIG. 1 is a fragmentary, cross-sectional view of a dunnage bag incorporating a valve having a flow control element embodying the present invention, together with the end of fill tool that provides pressurized air to the interior of dunnage bag via the valve, shown in an initially actuated open state or position.

Presently preferred embodiments of a flow control device in the form of a valve 20 and flow control element 22 used therein are illustrated in FIGS. 1-9C. The valve 20 and flow control element 22 are illustrated in connection with a fluent container in the form of a dunnage bag 24, only a small portion of which is shown in FIG. 1. The dunnage bag 24 has an inner layer 26 of plastic and an outer layer 28 of paper or polywoven fiber, with the inner layer 26 being welded or otherwise bonded or joined to an annular flange 30 of the valve 20, and the outer layer 28 being retained around the valve 20 by a resilient washer 32. While a preferred embodiment is shown, it should be understood that the particular type or construction of the dunnage bag 24 is not critical to the invention, and that the attachment of the valve 20 to the dunnage bag 24 can be made via any suitable means for the particular type or construction of dunnage bag 24 employed with the valve. The outlet end of a fill tool 34 is also shown in FIG. 1, with the fill tool engaged against an actuator 36 of the valve 20 to move the flow control element 22 from a normally closed position (shown in FIGS. 5, 7A, 8A, and 9A) to an open position shown in FIG. 1 whereby pressurized air supplied by the fill tool 34 can pass through the valve 20 into the interior of the dunnage bag 24. Further details of the fill tool 34 are not critical to the invention, and any suitable type or construction of fill tool can be utilized with the inventive concepts as dictated by the requirements of each particular application.

Figure 2:
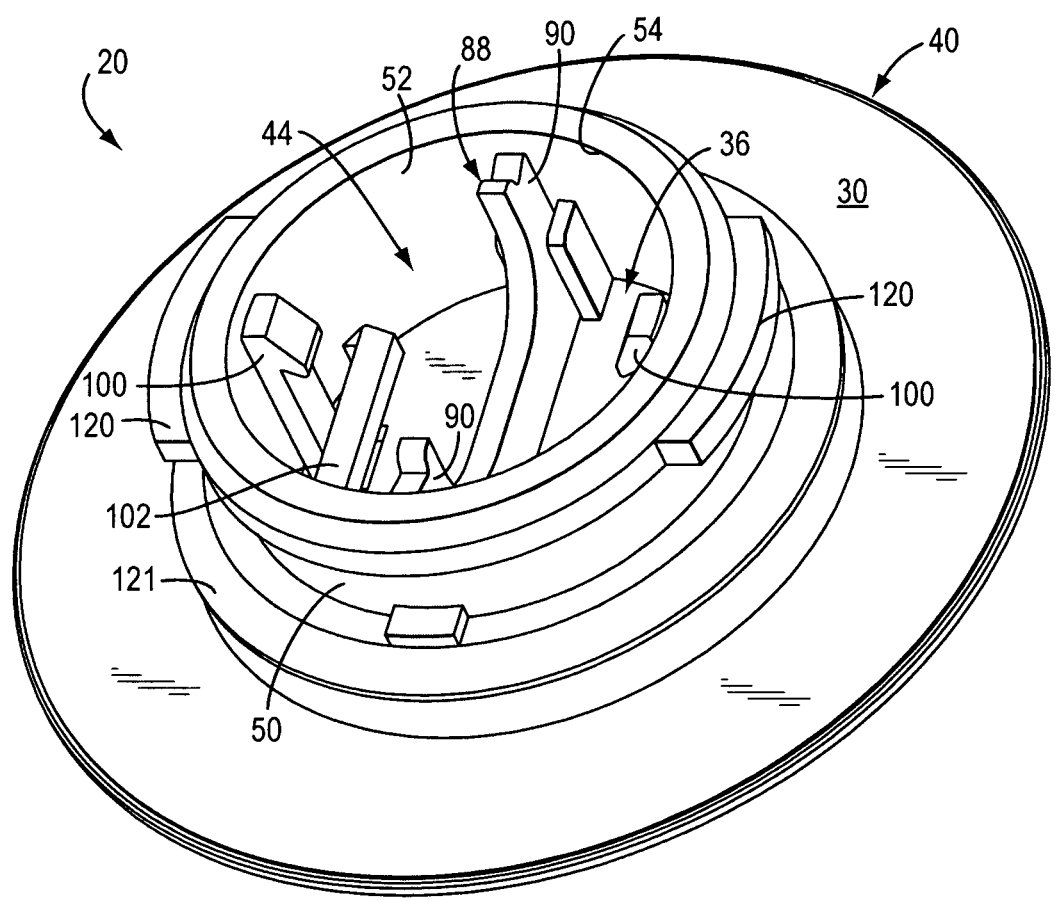
Figure 5:
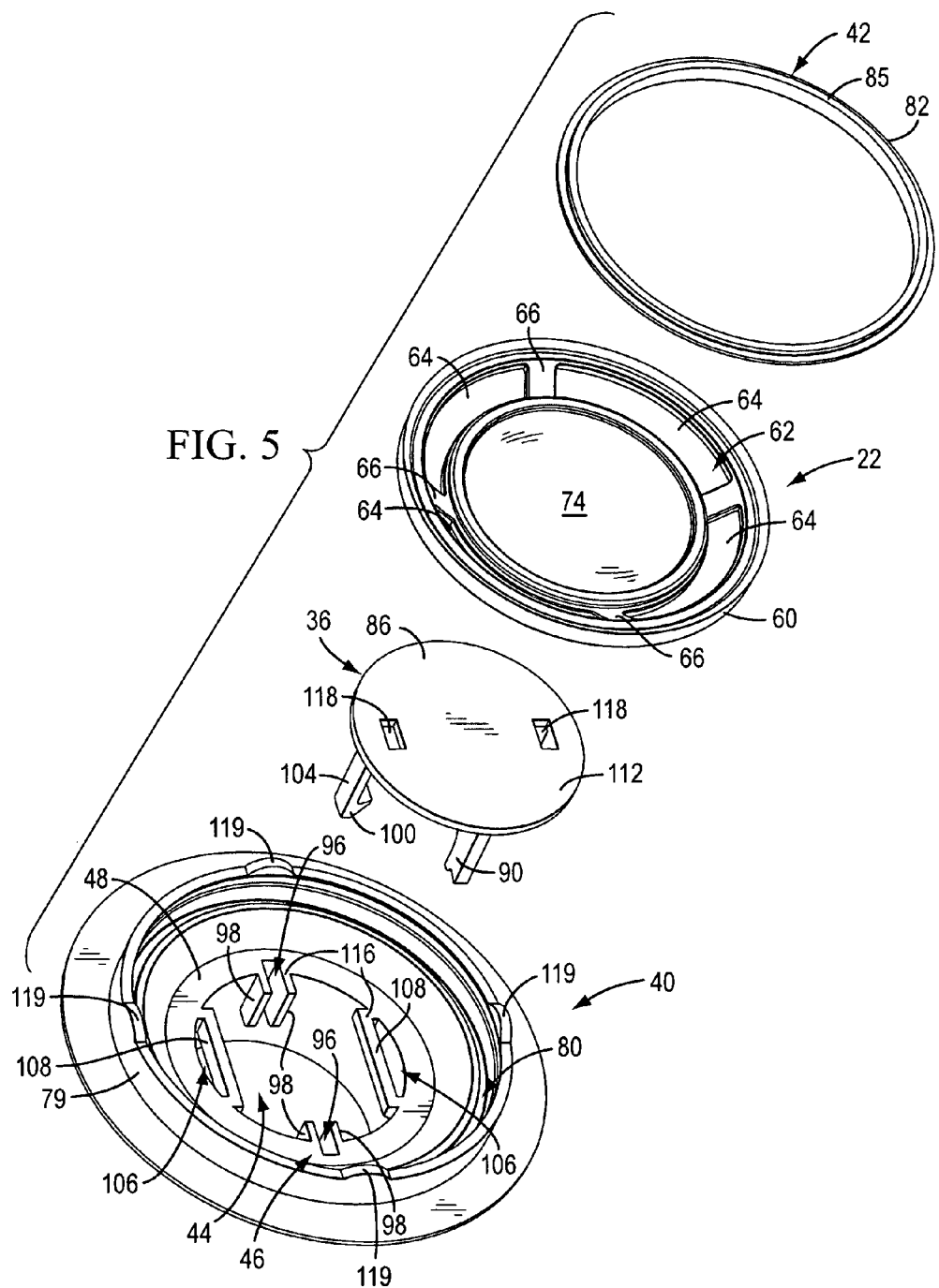

The valve 20 includes a valve body or housing 40 that carries the actuator 36 and the flow control element 22, which is retained to the housing 40 by a retainer ring 42. As best seen in FIG. 2, the housing 40 includes a cylindrical shaped flow passage, shown generally at 44, that allows for the passage of pressurized air into and out of the dunnage bag 24. The housing 40 further includes an annular valve seat 46 defining a planar seal surface 48 around the flow passage 44, as best seen in FIG. 5. As best seen in FIGS. 1 and 2, the housing 40 also includes an axially outwardly projecting annular wall 50 extending from the flange 30 toward the exterior of the bag 24. The wall 50 defines a radially inwardly facing, cylindrical surface 52 that forms at least part of the flow passage 44 and extends outwardly to define an opening or port 54 (FIG. 1) for receiving the fill tool 34 and/or for allowing the passage of air or other fluent material into and out of the valve 20 and the bag 24. While any suitable construction and material can be used depending upon the specific requirements and parameters of each application, the housing 40 is preferably a unitary, one-piece molding made of a suitable material, and preferably a suitable polymer material.

Figure 3:
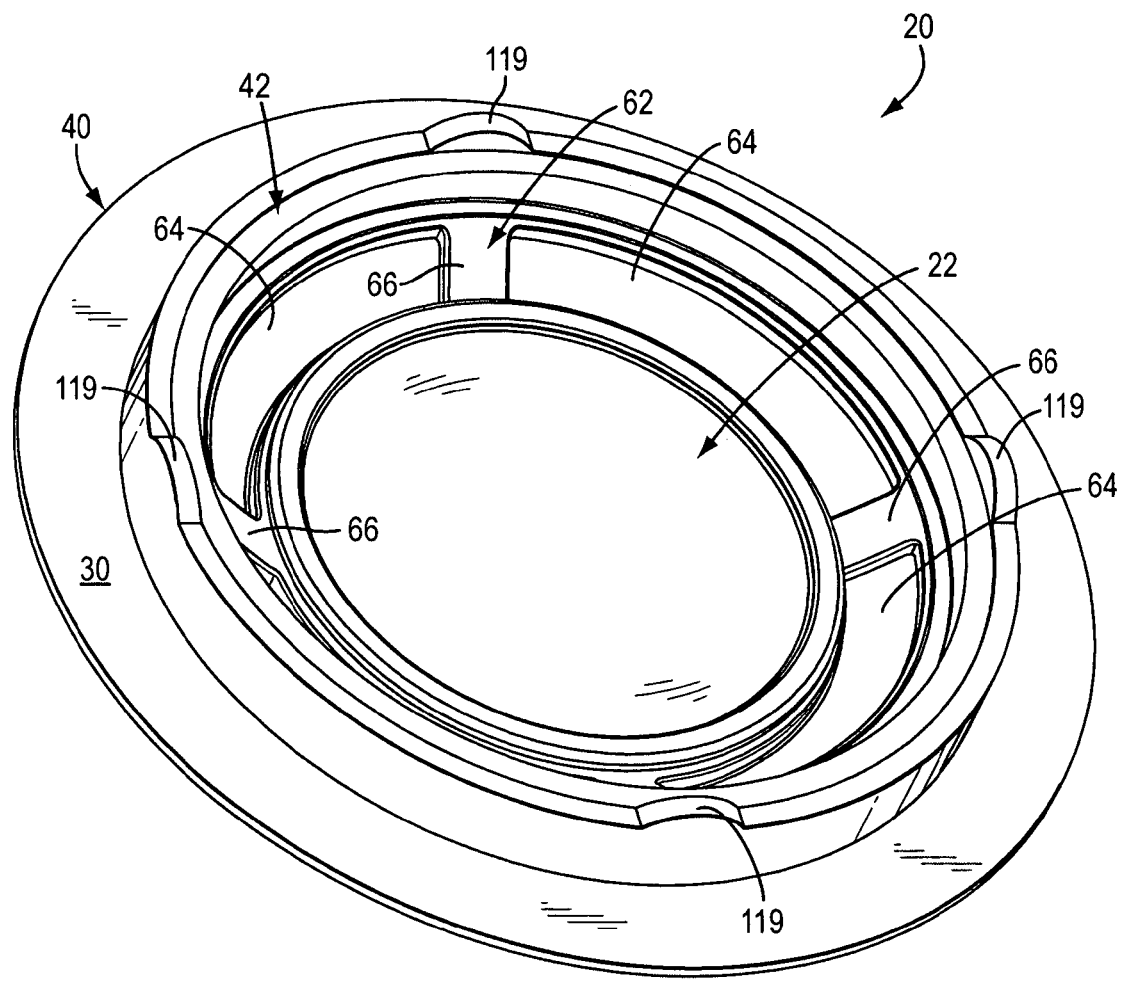
Figure 4:
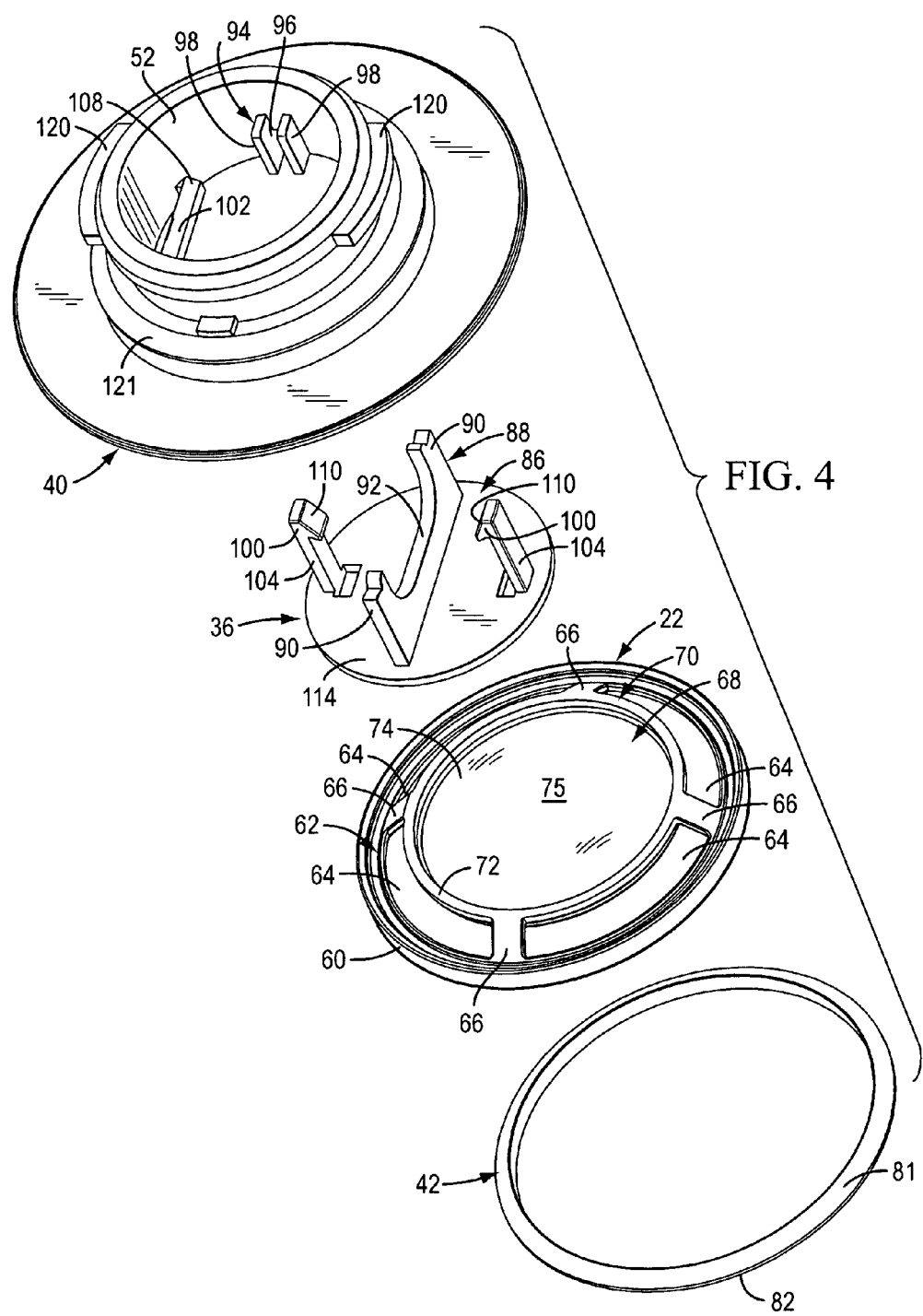
Figure 7A:
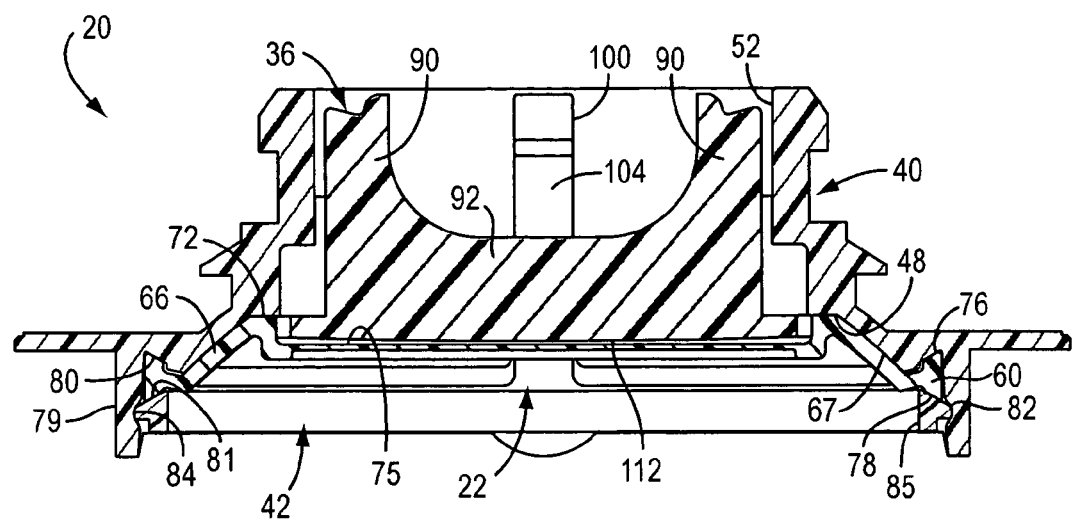
FIGS. 7A, 8A and 9A are section views taken along lines 7-7, 8-8 and 9-9 in FIG. 6, respectively, and showing the valve in a closed state or position.

As best seen in FIGS. 4 and 5, the flow control element 22 includes a peripheral attachment portion or flange 60 for attachment to the housing 40; a resilient, intermediate portion, shown generally at 62, extending generally laterally inwardly from the peripheral attachment portion 60 and defining four flow apertures 64 that extend circumferentially between four circumferentially spaced, resilient legs 66; and an imperforate central portion 68 that extends generally laterally inwardly from the intermediate portion 62. The intermediate portion 62 has a straight sided, frusto-conical shape and the housing 40 includes a surface 67 that conforms to this shape with the flow control element 22 in the closed position, as seen in FIG. 7A. As best seen in FIGS. 3 and 5, the flow control element 22 has an overall concave shape when viewed from the interior side of the valve 20. The central portion 68 includes a seal 70 (FIG. 4) having a generally annular configuration defining an annular seal surface 72 (FIGS. 4 and 7A) for sealing against the seal surface 48 of the housing 40 with the flow control element 22 in a closed position, such as shown in FIGS. 2, 7A, 8A, and 9A. The central portion 68 further includes a center region 74 (FIG. 4) that is located radially inwardly of the seal 70 and spaced axially inwardly from the seal surface 72. In the illustrated embodiment, the center region 74 is planar and has a stepped relief on the interior side thereof. The center region 74 also defines an outwardly facing surface 75 (FIG. 4) for engagement with the actuator 36. It will be appreciated, that in some applications, other configurations and shapes for the center region 74 and surface 75 may be desirable. Furthermore, it should be appreciated that, in some applications, it may be desirable for the central portion 68 to include an aperture or opening so as to be perforate, rather than imperforate, and that in such a construction, the central portion 68 can be sealed against the actuator 36 with the flow control element 22 in the normally closed position in order to prevent leakage through any opening or aperture in the central portion 68.

The flow control element 22 is preferably molded as a unitary structure from material which is flexible, pliable, elastic, and resilient. This can include elastomers, such as a synthetic, thermosetting polymer, including silicone rubber, such as the silicone rubber sold by Dow Corning Corp. in the United States of America under the trade designation SILAS-TIC 99-595-HC. Another suitable silicone rubber material is sold in the United States of America under the designation Wacker 3003-40 by Wacker Silicone Company. Preferred silicone rubber materials are sold by Dow Corning under designations LC-70 and 9280-70. Both of these materials preferably have a hardness rating of 70 Shore A. The flow control element 22 could also be molded from other thermosetting materials or from other elastomeric materials, or from thermoplastic polymers or thermoplastic elastomers, including those based upon materials such as thermoplastic propylene, ethylene, urethane, and styrene, including their halogenated counterparts.

The flow control element 22 is preferably designed to close when the pressure differential across the central portion 68 drops below a predetermined amount. In this regard, the inherent resiliency of the intermediate portion 62 allows the flow control element 22 to return to the normally closed condition (by action of the force generated from the resilient deformational stresses). Preferably, the flow control element 22 is sufficiently stiff in its unconstrained condition so that it would remain closed under the weight the actuator 36 bearing against the central portion 68 even without a closing force generated by a positive pressure in the bag 24.

To accommodate mounting and retention of the flow control element 22, the flange 60 preferably has a generally dovetail-shaped, transverse cross section which defines a pair of frusto-conical surfaces 76 and 78, as best seen in FIG. 7A. The housing 40 includes an inwardly projecting annular wall 79 that surrounds the flange 60, and an annular seat 80 provided in the housing 40 for matingly engaging the axially inwardly facing frusto-conical surface 76 of the flange 60. The retainer ring 42 has an axially inwardly facing clamping surface 81 which is adapted to matingly engage, and clamp against, the axially outwardly facing frusto-conical surface 78 of the flange 60. A lateral peripheral edge 82 of the retainer ring 42 can be maintained in snap-fit engagement with an annular retaining groove 84 in the wall 79 of the housing 40 that is spaced axially from the annular seat 80. The snap-fit engagement of the retainer ring 42 within the 40 causes the ring 42 to clamp the flow control member 22 tightly in the housing 40. The ring 42 preferably also includes a generally cylindrical wall 85 extending axially from the retainer ring 42 to assist in assembly and disassembly of the valve 20.

During assembly, the retainer ring 42 can be pushed into engagement with the retaining groove 84 because there is sufficient flexibility in the retainer ring 42 and/or housing 40 to accommodate temporary, elastic deformation of the components as the retainer ring 42 is moved into engagement with the groove 84 to create a snap-fit engagement between the retainer ring 42 and housing 40 such that the flange 60 is compressed at least slightly and clamped between the opposing frusto-conical surfaces 80 and 81 (FIG. 7A). While a preferred form of mounting has been shown, the housing 40 and flow control element 22 could have other configurations, such as a different shape for the mounting flange 60 and seat 80. Also, in some other arrangements, the flow control element 22 could be held in the housing 40 without a retainer ring. For example, the flow control element 22 could be held in the housing 40 by heat bonding, swaging of a portion of the housing 40 over the flange 60, adhesive, and/or a press fit, etc.

Figure 6:
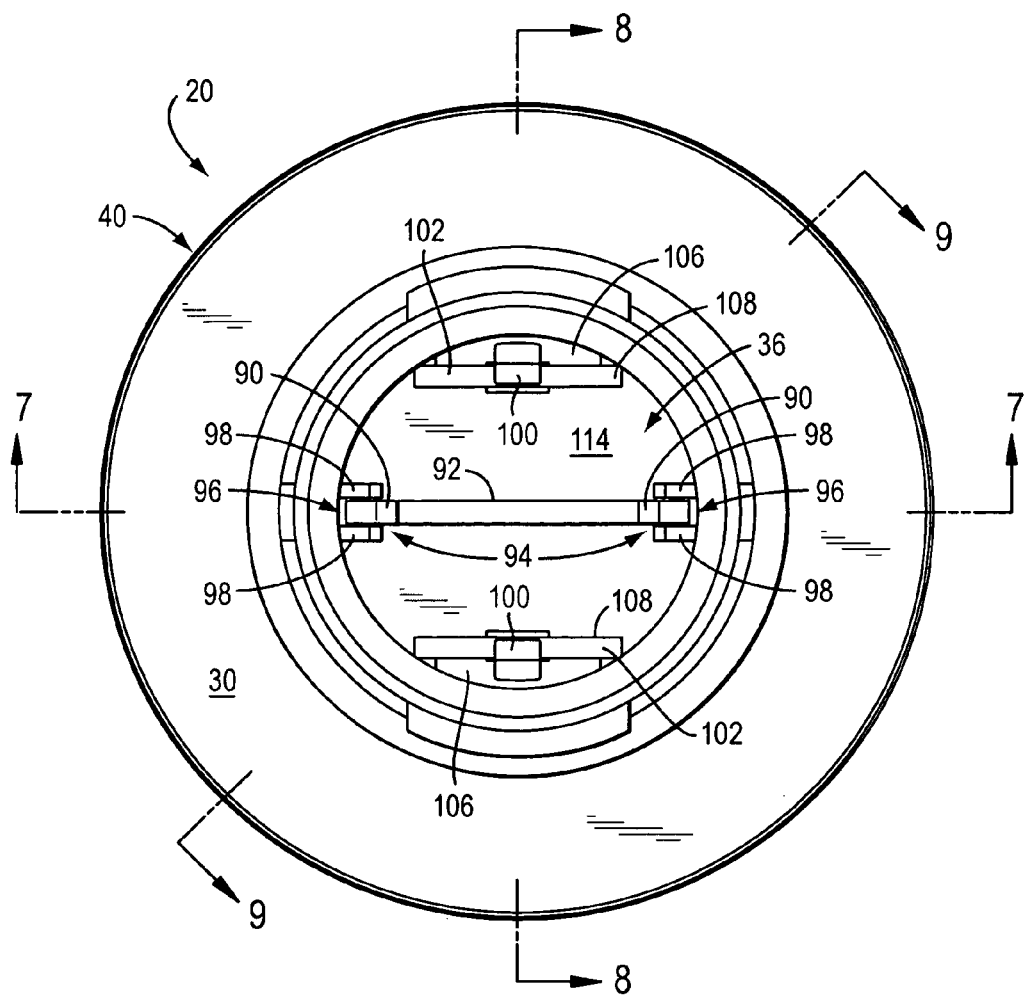

As best seen in FIG. 2, the actuator 36 is disposed in the housing 40 for movement between a first position (shown in FIGS. 4, 7A, 8A, and 9A) and a second position (shown in FIGS. 1, 7B, 8B, and 9B). As best seen in FIG. 4, the actuator 36 includes base or probe 86 and a force-bearing member 88 in the form of two laterally spaced legs 90 that extend axially outwardly from the base 86. As shown in the illustrated embodiment, for structural purposes the legs 90 can be joined by a beam section 92 extending between the legs on the base 86. Each of the legs 90 is received in and axially guided for movement between the first and second positions by a corresponding guide 94 provided in the housing 40 in the form of groove 96 defined between two lands 98 extending from laterally inwardly from the surface 52. The actuator 36 also includes a pair of laterally spaced stops 100 for engagement with a corresponding pair of stop surfaces 102 on the housing 40, with each of the stops 100 being connected to the base 86 by an axial extension 104. As best seen in FIGS. 2, 8A and 9A, the stops 100 are spaced from the stop surfaces 102 with the actuator 36 in the first position, and, as best seen in FIGS. 7B, 7C, 8B, 8C, 9B, and 9C, are engaged against the stop surfaces 102 with the actuator 36 in the second position. As best seen in FIG. 6, in the illustrated embodiment, the extensions 104 are each received in a corresponding slot 106 defined between the surface 52 and a bridge 108 connected at both of its ends to the surface 52 (at 116 in FIG. 5). Each of the bridges 108 defines a corresponding one of the stop surfaces 102. Each of the stops 100 includes a wedge shaped nose 110 (FIG. 4) that allows for a snap fit connection by elastically deforming the corresponding bridge 108 and/or nose 110 as the nose 110 is inserted through the corresponding slot 106. As best seen in FIGS. 4 and 5, in the illustrated embodiment, the base 86 is planar and defines an inwardly facing planar surface 112 for engagement with the surface 75 of the central portion 68, and an outwardly facing planar surface 114 from which the legs 90, beam section 92, and extensions 104 extend or project. The surface 114 is engageable with housing surfaces, such as at 116 (FIG. 5), adjacent the seat 80 to limit movement of the actuator 36 in the axially outward direction from the housing 40. A pair of openings 118 (FIG. 5) can be provided in the actuator base 86 to allow for the stops 100 and the actuator 36 to be formed using a single-pull mold tool. In this regard, while any suitable construction and material can be used depending upon the specific requirements and parameters of each application, the actuator 36 is preferably a unitary, one-piece molding made of a suitable material, and preferably a suitable polymer material.

As another feature, curved projections 119 (FIG. 5) can be provided on the wall 79 extending in an axially inward direction to space an opposite side (not shown) of the dunnage bag 24 from the housing 40 to allow for the flow of air into the dunnage bag 24 without producing so called "bag burn" during initial inflation of the bag 24. Additionally, the housing 40 may include a suitable connector, such as a pair of bayonet connections 120 (FIG. 4), on the wall 50 for engagement with mating connections on the fill tool 34. The housing 40 may also include a frusto-conical shaped washer flange 121 for retaining the washer 32.

Figure 7C:
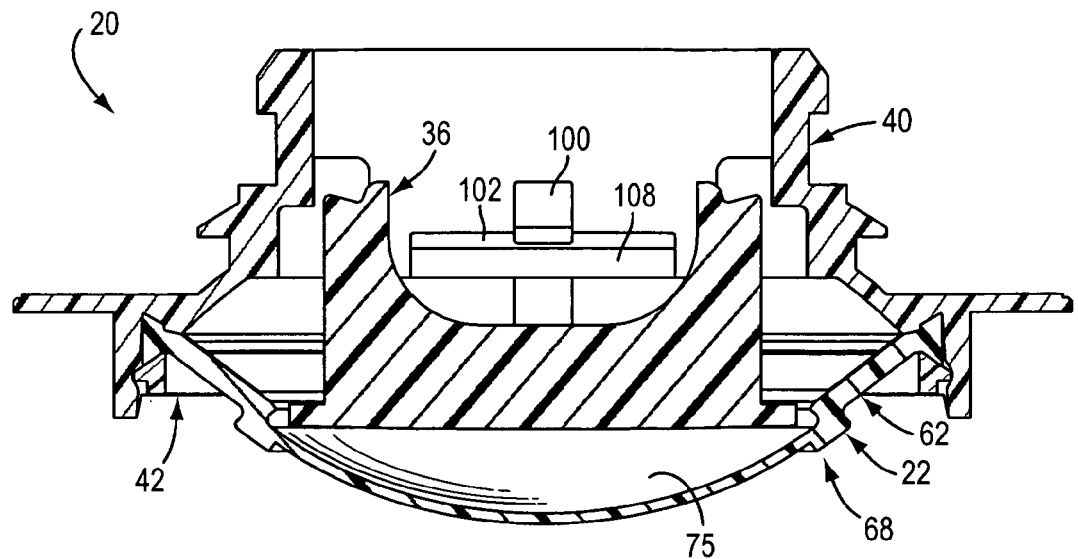
FIGS. 7C, 8C and 9C are section views taken along lines 7-7, 8-8 and 9-9 in FIG. 6, respectively, and showing the valve in the open position or state with pressurized air being supplied on an inlet side of the valve.
Figure 8A:
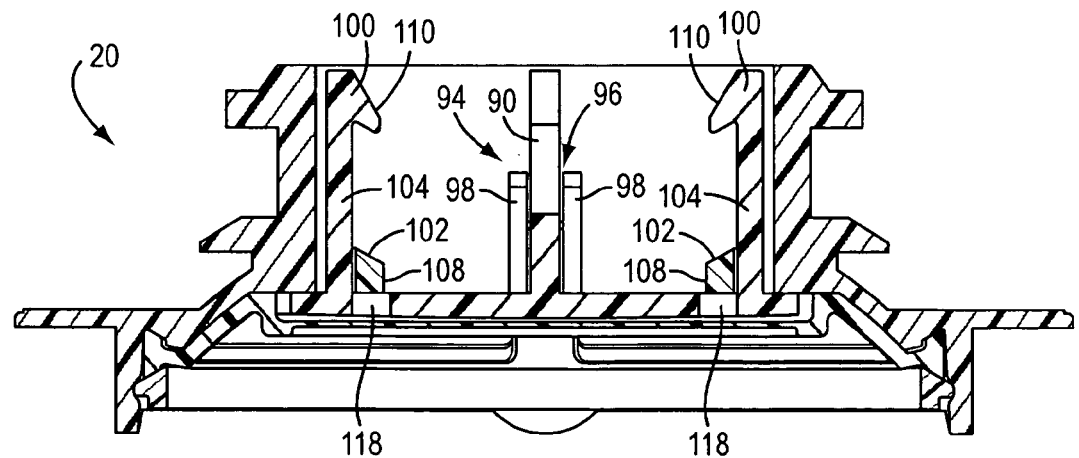
Figure 8B:
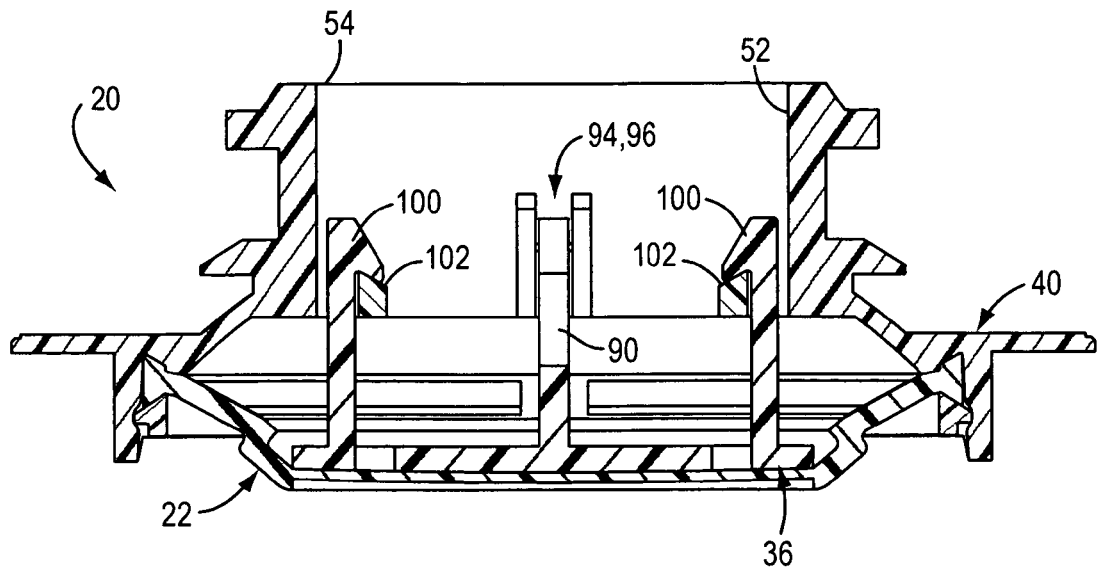
Figure 8C:
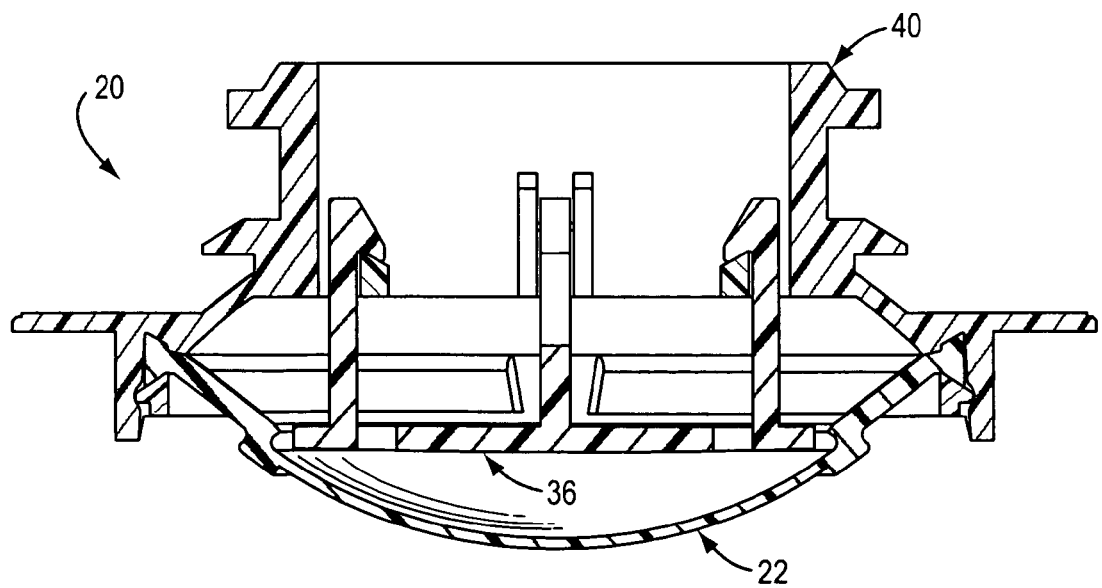
Figure 9A:
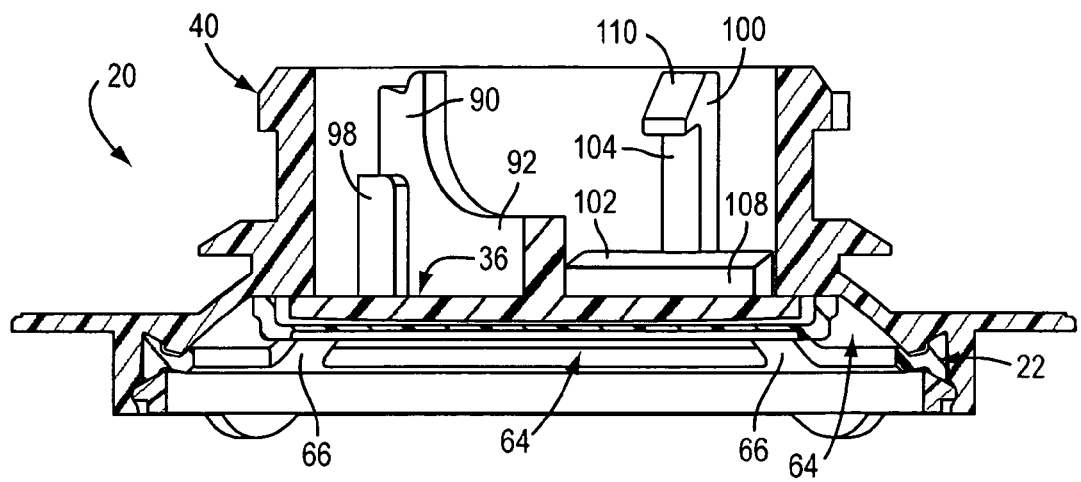
Figure 9B:
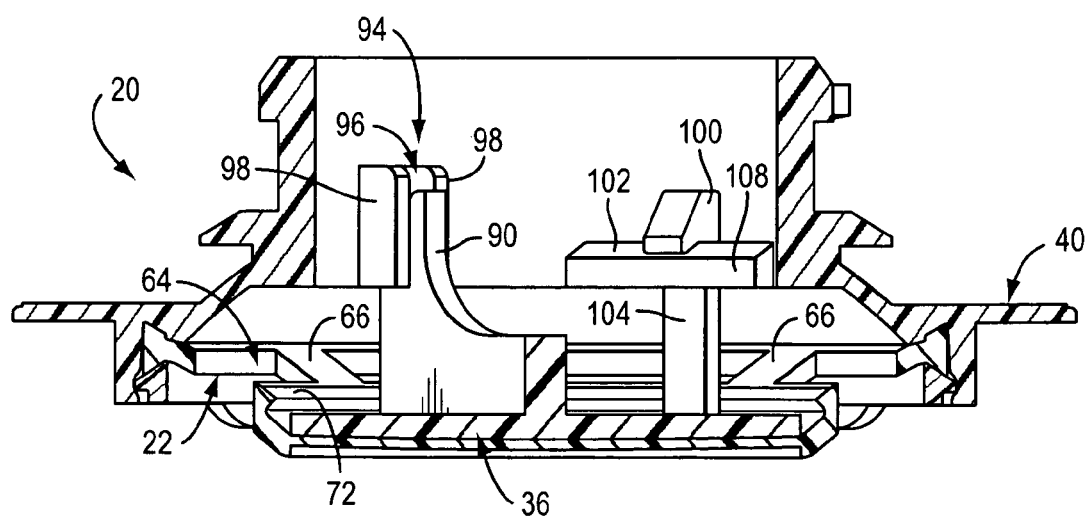
Figure 9C:
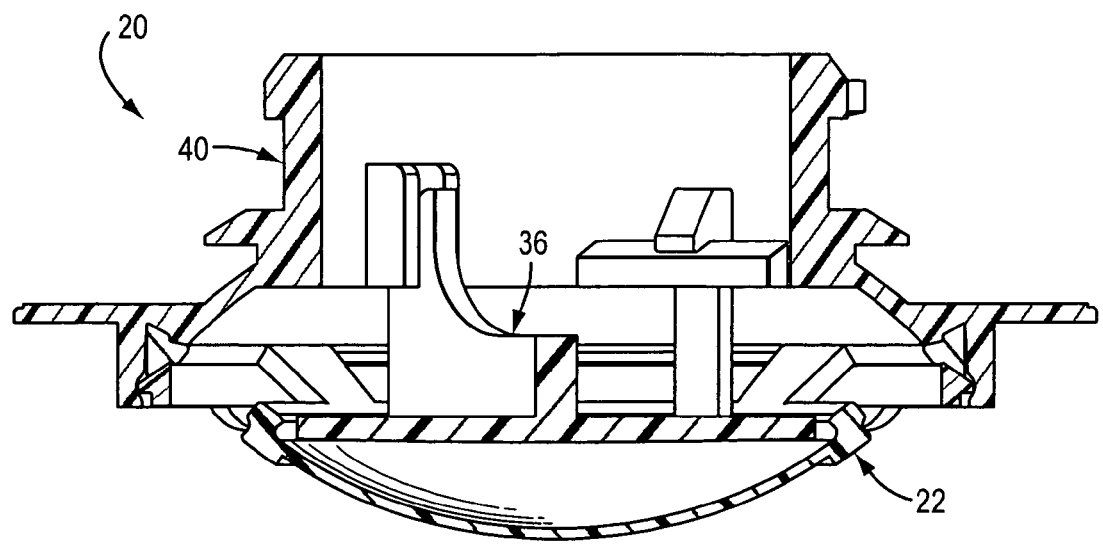

In operation, the valve 20 rests in the normally closed position shown in FIGS. 2, 3, 7A, 8A and 9A with, or without a pressure differential being applied across the flow control element 22. When it is desired to inflate the dunnage bag 24, the fill tool 34 is inserted through the port 54 into engagement with the legs 90 of the actuator 36 to move the actuator 36 away from the first position and the flow control element 22 away from the closed position, thereby allowing flow of pressurized air to pass from the fill tool 34 through the housing passage 44 and flow control element apertures 64 into the interior of the dunnage bag 24. In this regard, FIGS. 7C, 8C and 9C illustrate the valve 20 with the flow element 22 being distended by a pressurized air flow passing through the valve 20 into the dunnage bag. When the dunnage bag 24 is inflated to the desired size and/or pressure, the fill tool 34 is removed from the valve 20 and the actuator 36 moves (returns) to the first position, and the flow control element moves back to the closed position, thereby sealing the pressurized air within the dunnage bag 24.

It should be appreciated that the flow control element 22 can be moved away from the closed position simply by supplying a flow of pressurized air into the housing passage 44, without engagement of the fill tool 34 with the actuator 36. In this regard, it should also be appreciated that in applications that do not utilize a fill tool that will be inserted into the housing 40, the actuator 36 may not be required.

Figure 7B:
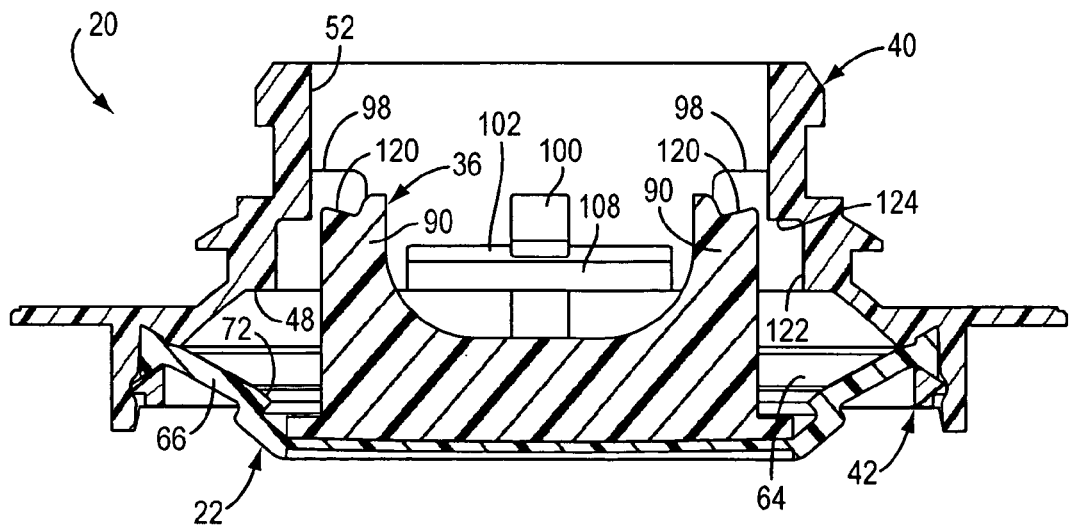
FIGS. 7B, 8B and 9B are section views taken along lines 7-7, 8-8 and 9-9 in FIG. 6, respectively, and showing the valve in an open state or position.

With reference to FIG. 7B, optionally each of the legs 90 may include a notched end 120, and the housing cylindrical wall surface 52 between the spaced-apart lands 98 may include a step 122 defining a shoulder 124 which can engage the notched end 120 of the corresponding leg 90 with appropriate displacement of the actuator 36 relative to the housing 40. In this regard, if sufficient lateral clearance is provided between the legs 90 and the wall 52 and sufficient clearance is provided in the length of housing slots 106 relative to the extensions 104, the actuator 36 can be slid laterally toward one of the steps 122 or the other while also being slightly tilted to engage the notched end 120 of the corresponding leg 90 against the shoulder 124, thereby retaining the actuator 36 in the second position and the flow control element 22 in the open position to allow discharge of the air within the dunnage bag 24 via the valve 20. This allows the dunnage bag 24 to be deflated without active oversight by a user and can be referred to as "walk-away deflation".

Figure 10:
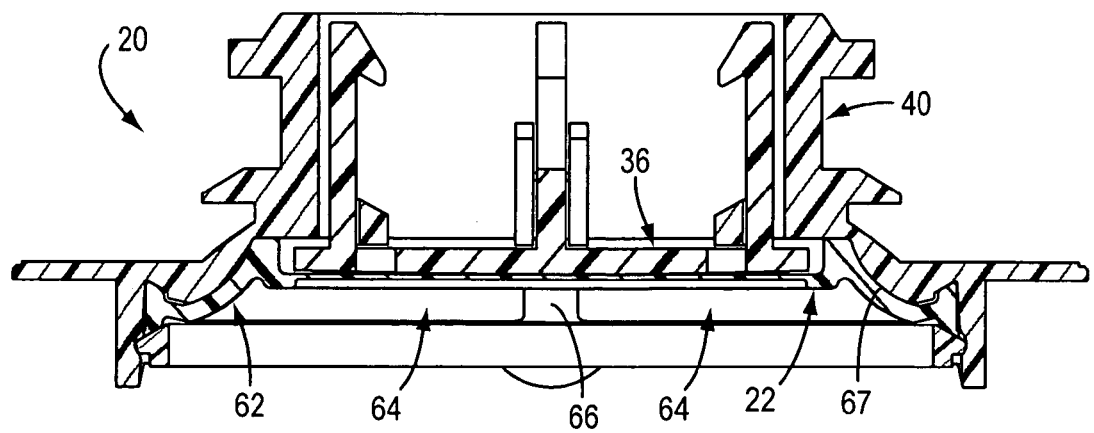
Figure 11:
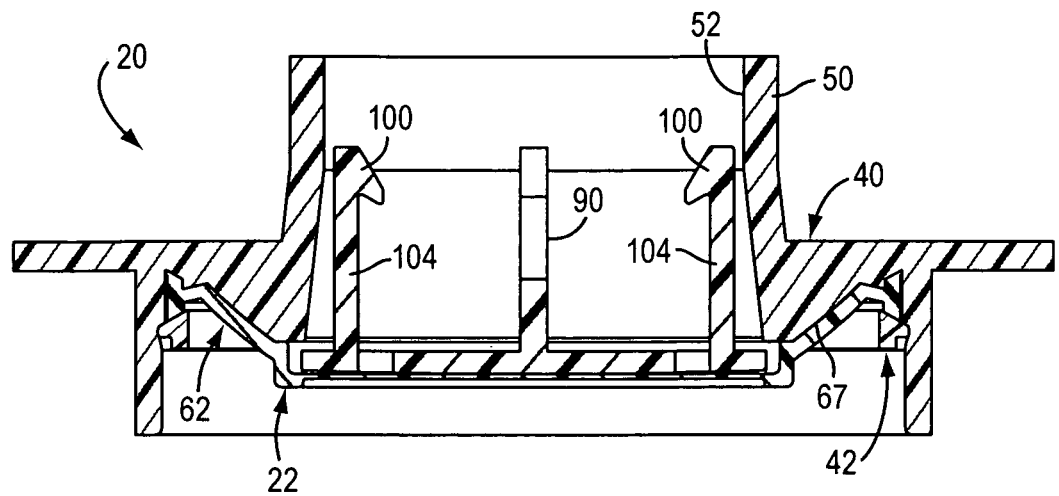
Figure 12:
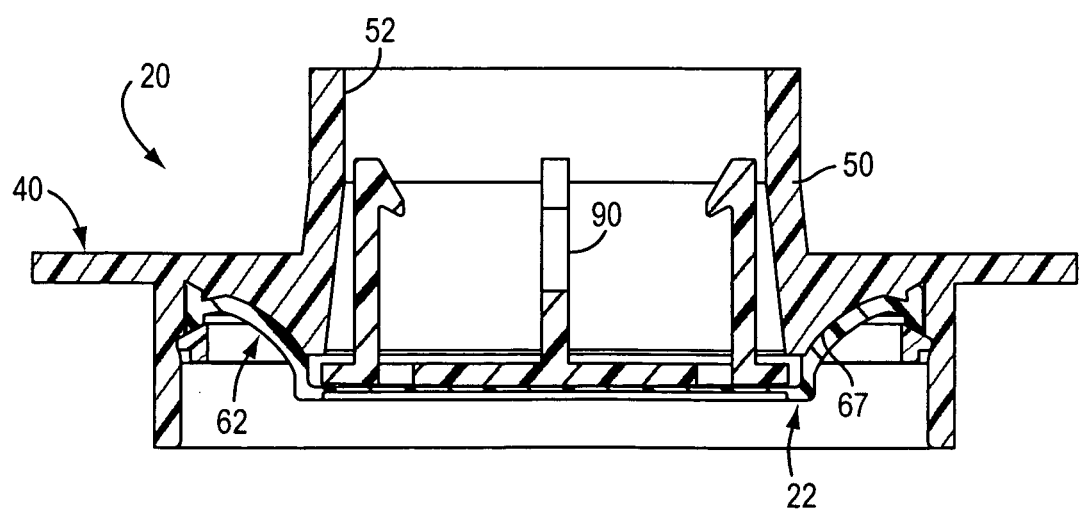

Each of FIGS. 10, 11 and 12 illustrate alternate embodiments for the valve 20 and flow control element 22. The embodiment of FIG. 10 differs from the embodiment of FIGS. 1-9C in that the intermediate portion 62 has a curved or arcuate shape that is convex when viewed from the interior side of the valve 20, rather than the straight conical shape of the embodiment shown in FIGS. 1-9C. In this regard, the corresponding surface 67 of the housing 40 is shaped to conform to the curved shape of the intermediate portion 62.

The embodiment shown in FIG. 11 differs from the embodiment shown in FIGS. 1-9C in that the flow control element 22 has an overall convex shape when viewed from the interior side of the valve 20, rather than the concave shape of the embodiment of FIGS. 1-9C, and of the embodiment of FIG. 10. Again, the surface 67 of the housing 40 conforms to the shape of the intermediate portion 62 in FIG. 11. The embodiment of FIG. 11 also differs from the embodiments of FIGS. 1-10 in that the housing 40 does not include the bayonet connections 120 or the washer flange 121, and the guides 94, stop surfaces 102 and bridges 108 have been removed such that the actuator 36 is loosely guided for movement between the first and second positions by interaction between the wall 52 and the legs 90 and extensions 104.

The embodiment shown in FIG. 12 is similar to the embodiment of FIG. 11, but differs in that the intermediate portion 62 is curved, rather than having a straight frusto-conical shape such as in FIG. 11.

It will be readily apparent from the foregoing detailed description of the invention and from the illustrations thereof that numerous variations and modifications may be effected without departing from the true spirit and scope of the novel concepts or principles of this invention.

The invention claimed is:

1. A flow control element for operatively cooperating with a housing having a seal surface around a flow passage, said flow control element comprising:
   (A) a peripheral attachment portion by which said flow control element may be attached to the housing;
   (B) a resilient, intermediate portion extending generally laterally inwardly from said peripheral attachment portion and defining at least one flow aperture;
   (C) an imperforate central portion extending generally laterally inwardly from said intermediate portion and including a seal for sealing against said housing seal surface around said housing flow passage with said flow control element in a normally closed position, and wherein
   said intermediate portion of said flow control element accommodates movement of said seal between the normally closed position and an open position away from said housing seal surface in response to said flow control element central portion being subjected to an opening force, thereby permitting flow of a fluent substance through said housing flow passage and through said at least one flow aperture of said flow control element intermediate portion;
   said seal has a generally annular configuration at a radially outward region of said central portion;
   said at least one flow aperture defined by said flow control element intermediate portion is one of a plurality of such flow apertures; and
   said intermediate portion includes a plurality of circumferentially spaced resilient legs extending between said attachment portion and said seal.

2. A flow control element for operatively cooperating with a housing having a seal surface around a flow passage, said flow control element comprising:
   (A) a peripheral attachment portion (60) by which said flow control element may be attached to the housing;
   (B) a resilient, intermediate portion extending generally laterally inwardly from said peripheral attachment portion and defining at least one flow aperture;
   (C) an imperforate central portion extending generally laterally inwardly from said intermediate portion and including a seal for sealing against said housing seal surface around said housing flow passage with said flow control element in a normally closed position, and wherein said intermediate portion of said flow control element accommodates movement of said seal between the normally closed position and an open position away from said housing seal surface in response to said flow control element central portion being subjected to an opening force, thereby permitting flow of a fluent substance through said housing flow passage and through said at least one flow aperture of said flow control element intermediate portion;

said seal has an annular configuration at a radially outward region of said central portion; and said central portion includes a center region that is located radially inwardly of said seal and that is spaced axially from said annular configuration of said seal.

3. The flow control element in accordance with claim 2 in which said flow control element is a unitary structure molded in a one piece, flexible, resilient material.

4. The flow control element in accordance with claim 2 in combination with said housing to define an assembly in which said housing and flow control element are held together at said peripheral attachment portion of said flow control element.

5. The flow control element of claim 2 in combination with said housing wherein said flow control element and said housing are separate parts that are mechanically mated together at said peripheral attachment portion of said flow control element.

6. A flow control device comprising:
(A) a housing defining
a flow passage;
a seal surface around said flow passage;
(B) a flow control element that includes
a peripheral attachment portion by which said flow control element may be attached to the housing;
a resilient, intermediate portion extending generally laterally inwardly from said peripheral attachment portion and defining at least one flow aperture; and
a central portion extending generally laterally inwardly from said intermediate portion and including a seal for sealing against said housing seal surface around said housing flow passage with said flow control element in a normally closed position;
wherein said intermediate portion of said flow control element accommodates movement of said seal between the normally closed position and an open position away from said housing seal surface in response to said flow control element central portion being subjected to an opening force, thereby permitting flow of a fluent substance through said housing flow passage and through said at least one flow aperture of said flow control element intermediate portion; and
(C) an actuator disposed for movement in said housing between first and second positions, the actuator enraged with the housing in both the first and second positions, the actuator including a force-bearing member, and a base engaged against the central portion of the flow control element to move the flow control element from the closed positioned to the open position with movement of the actuator from the first position to the second position.

7. The flow control device in accordance with claim 6 in which said housing defines an outwardly projecting annular wall that has a radially inwardly facing surface defining at least part of said housing flow passage.

8. The flow control device in accordance with claim 6 further including a retention ring mounted to said housing to clamp said flow control element peripheral attachment portion between said retention ring and a portion of said housing.

9. The flow control device in accordance with claim 6 in which said flow control element is a unitary structure molded in a one-piece, flexible, resilient material.

10. A flow control device comprising:
(A) a housing defining
a flow passage;
a seal surface around said flow passage;
(B) a flow control element that includes
a peripheral attachment portion by which said flow control element may be attached to the housing;
a resilient, intermediate portion extending generally laterally inwardly from said peripheral attachment portion and defining at least one flow aperture; and
a central portion extending generally laterally inwardly from said intermediate portion and including a seal for sealing against said housing seal surface around said housing flow passage with said flow control element in a normally closed position;
wherein said intermediate portion of said flow control element accommodates movement of said seal between the normally closed position and an open position away from said housing seal surface in response to said flow control element central portion being subjected to an opening force, thereby permitting flow of a fluent substance through said housing flow passage and through said at least one flow aperture of said flow control element intermediate portion;
(C) an actuator disposed for movement in said housing between first and second positions, the actuator including a force-bearing member, and a base engaged against the central portion of the flow control element to move the flow control element from the closed positioned to the open position with movement of the actuator from the first position to the second position; and
said actuator force-bearing member includes two radially spaced legs extending from the base in an axial direction opposite from the central portion of the flow control element.

11. The flow control device in accordance with claim 10 in which said housing includes a pair of axial guides, each of said axial guides receiving a corresponding one of the legs for axially guided movement between the first and second positions.

12. A flow control device comprising:
(A) a housing defining
a flow passage;
a seal surface around said flow passage;
(B) a flow control element that includes
a peripheral attachment portion by which said flow control element may be attached to the housing;
a resilient, intermediate portion extending generally laterally inwardly from said peripheral attachment portion and defining at least one flow aperture; and
a central portion extending generally laterally inwardly from said intermediate portion and including a sear for sealing against said housing seal surface around said housing flow passage with said flow control element in a normally closed position;
wherein said intermediate portion of said flow control element accommodates movement of said seal between the normally closed position and an open position away from said housing seal surface in response to said flow control element central portion being subjected to an opening force, thereby permitting flow of a fluent substance through said housing flow passage and through said at least one flow aperture of said flow control element intermediate portion;

(C) an actuator carried in said housing and disposed for movement in said housing between first and second positions, the actuator including a force-bearing member, and a base engaged against the central portion of the flow control element to move the flow control element from the closed positioned to the open position with movement of the actuator from the first position to the second position; and in which said actuator base has a planar surface facing said central portion for engagement therewith.

13. A flow control device comprising:
(A) a housing defining
a flow passage;
a seal surface around said flow passage;
(B) a flow control element that includes
a peripheral attachment portion by which said flow control element may be attached to the housing;
a resilient, intermediate portion extending generally laterally inwardly from said peripheral attachment portion and defining at least one flow aperture; and
a central portion extending generally laterally inwardly from said intermediate portion and including a seal for sealing against said housing seal surface around said housing flow passage with said flow control element in a normally closed position;
wherein said intermediate portion of said flow control element accommodates movement of said seal between the normally closed position and an open position away from said housing seal surface in response to said flow control element central portion being subjected to an opening force, thereby permitting flow of a fluent substance through said housing flow passage and through said at least one flow aperture of said flow control element intermediate portion;
(C) an actuator disposed for movement in said housing between first and second positions, the actuator including a force-bearing member, and a base engaged against the central portion of the flow control element to move the flow control element from the closed positioned to the open position with movement of the actuator from the first position to the second position;
said housing includes a pair of stop surfaces; and
said actuator includes a pair of stops connected to the base, the stops spaced from the stop surfaces in the first position and abutted against the stop surfaces in the second position.

14. The flow control device in accordance with claim 13 wherein each of the stops is connected to the base by a pair of extensions.

15. The flow control device in accordance with claim 14 wherein the housing further includes a pair of slots, each slot receiving a corresponding one of the extensions and wherein a corresponding one of the stop surfaces is provided immediately adjacent each of the slots for engagement with a corresponding stop in the second position.

16. The flow control device in accordance with claim 15 wherein the stops and the slots form a snap fit connection between the actuator and the housing.

17. A flow control device comprising:
(A) a housing defining
a flow passage;
a seal surface around said flow passage;
(B) a flow control element that includes
a peripheral attachment portion by which said flow control element may be attached to the housing;
a resilient, intermediate portion extending generally laterally inwardly from said peripheral attachment portion and defining at least one flow aperture; and
a central portion extending generally laterally inwardly from said intermediate portion and including a seal for sealing against said housing seal surface around said housing flow passage with said flow control element in a normally closed position;
wherein said intermediate portion of said flow control element accommodates movement of said seal between the normally closed position and an open position away from said housing seal surface in response to said flow control element central portion being subjected to an opening force, thereby permitting flow of a fluent substance through said housing flow passage and through said at least one flow aperture of said flow control element intermediate portion;
(C) an actuator disposed for movement in said housing between first and second positions, the actuator including a force-bearing member, and a base engaged against the central portion of the flow control element to move the flow control element from the closed positioned to the open position with movement of the actuator from the first position to the second position; and
wherein said base has a surface opposite from the central portion, the surface engageable against the housing to limit movement of the actuator away from the central portion.

18. A flow control device comprising:
(A) a housing defining
a flow passage;
a seal surface around said flow passage;
(B) a flow control element that includes
a peripheral attachment portion by which said flow control element may be attached to the housing;
a resilient, intermediate portion extending generally laterally inwardly from said peripheral attachment portion and defining at least one flow aperture; and
a central portion extending generally laterally inwardly from said intermediate portion and including a seal for sealing against said housing seal surface around said housing flow passage with said flow control element in a normally closed position;
wherein said intermediate portion of said flow control element accommodates movement of said seal between the normally closed position and an open position away from said housing seal surface in response to said flow control element central portion being subjected to an opening force, thereby permitting flow of a fluent substance through said housing flow passage and through said at least one flow aperture of said flow control element intermediate portion;
(C) an actuator disposed for movement in said housing between first and second positions, the actuator including a force-bearing member, and a base engaged against the central portion of the flow control element to move the flow control element from the closed positioned to the open position with movement of the actuator from the first position to the second position; and
further comprising a snap fit connection between the actuator and the housing.

* * * * *